United States Patent Office 3,182,662
Patented May 11, 1965

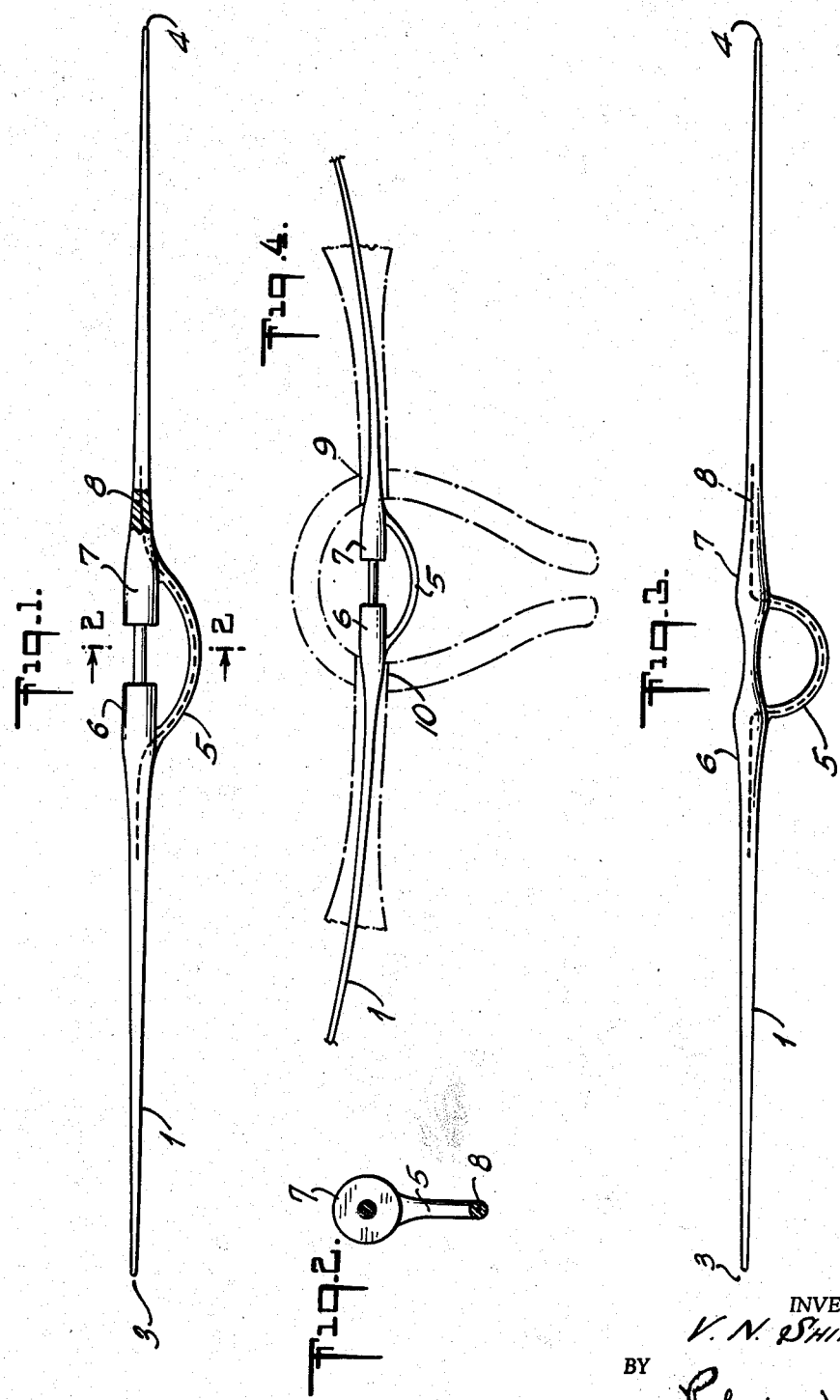

3,182,662
PLASTIC PROSTHESIS USEFUL IN GYNAECO-
LOGICAL SURGERY
Vithal N. Shirodkar, Patel Chambers, French Bridge,
Bombay 7, Maharashtra, India
Filed July 25, 1962, Ser. No. 212,382
5 Claims. (Cl. 128—303)

This invention relates to an internal splint useful in gynaecological surgery and more particularly to a device designed to prevent post-operative occlusion of the tubal lumen following a tuboplasty operation.

Tuboplasty is a technique in gynaecological surgery whereby diseased Fallopian tubes may be repaired. Following the publication of collected statistics by Greenhill and Hellman on the end results of tuboplasty, many surgeons had the impression that these operations were of little practical value. In approximately 50% of the cases occlusion occurred and even in those cases when tubal patency was restored pregnancy occurred in only a small number of the patients.

It is an object of the present invention to make available to the surgeon an internal splint whereby the cornual end of the implanted tubes can be kept open until the surgical repair has healed.

The construction and use of the internal splint of the present invention will be best understood with reference to the accompanying drawings in which:

FIG. 1 is a plan view of an internal splint.
FIG. 2 is a sectional view along the line 2—2 of FIG. 1.
FIG. 3 is a plan view of a modified form of internal splint.
FIG. 4 is a diagrammatic view of the internal splint showing the position of the splint in the uterus following tuboplasty.

The splint illustrated in FIG. 1 is generally symmetrical and comprises a flexible elongated rod-like member 1, which may be circular in cross-section and is about 8 inches in length. The rod 1 is preferably molded of a plastic material such as polyethylene and formed integral therewith is a loop 5 positioned centrally approximately equidistant from the ends 3 and 4 of the rod. This loop is about three-fourths of an inch in diameter. The rod 1 is provided with a conical taper at the points 6 and 7 and is approximately uniform in diameter between these points and the ends 3 and 4. This shape facilitates positioning the splint within the uterus.

Since X-rays will not detect many plastic materials such as polyethylene, it is highly important that the rod 1 and loop 5 be reinforced with a radiopaque material 8 such as linen or tantalum wire.

In using the internal splint of the present invention, the surgeon passes the arm 1 of the tubal splint through the cornual openings 9 and 10 and manually compresses the loop 5 pushing it into the uterine cavity so that the two lateral arms project through the walls of the uterus, as illustrated in FIG. 4. The segments of the fallopian tubes to be implanted are then slipped over the laterally extending arms of the splint and sutured to the uterus to close the openings 9 and 10.

The advantage of the central loop is that it prevents the internal splint from sliding sideways and since it is in the uterine cavity, it can be kept in for many months to prevent the implantation site from contracting and causing occlusion. The splint may be removed from the uterus four to six months following surgery.

What is claimed is:
1. An internal splint useful in preventing post operative occlusion of the tubal lumen following a tuboplasty operation, comprising a sterile and flexible elongated rod that is substantially straight and made of a molded form retaining plastic material, said rod having a small diameter relative to its length and having a loop integral therewith and centrally located approximately equidistant between each end, said loop being of relatively small size as compared to the length of the rod and protruding only a relatively short distance off the axis of the rod.

2. The internal splint as defined in claim 1 wherein the elongated rod is generally circular in cross-section.

3. An internal splint as defined by claim 1 wherein the elongated rod is composed of polyethylene.

4. An internal splint as defined in claim 1 reinforced with a radiopaque material.

5. The internal splint of claim 8 in which the radiopaque material is tantalum wire.

References Cited by the Examiner
UNITED STATES PATENTS

| | | | |
|---|---|---|---|
| 662,716 | 11/00 | Gaedeke | 128—130 |
| 2,176,559 | 10/39 | Meckstroth | 128—130 |
| 2,587,910 | 3/52 | Shulman | 128—348 X |
| 2,856,934 | 10/58 | Petillo | 128—349 |
| 2,857,915 | 10/58 | Sheridan | 128—349 |
| 3,042,030 | 7/62 | Read. | |

RICHARD A. GAUDET, Primary Examiner.

JORDAN FRANKLIN, Examiner.

UNITED STATES PATENT OFFICE
CERTIFICATE OF CORRECTION

Patent No. 3,182,662                                    May 11, 1965

Vithal N. Shirodkar

It is hereby certified that error appears in the above numbered patent requiring correction and that the said Letters Patent should read as corrected below.

Column 2, line 35, for the claim reference numeral "8" read -- 4 --.

Signed and sealed this 21st day of September 1965.

(SEAL)
Attest:

ERNEST W. SWIDER                                 EDWARD J. BRENNER
Attesting Officer                                      Commissioner of Patents